United States Patent
Dietz et al.

(10) Patent No.: US 10,228,551 B1
(45) Date of Patent: Mar. 12, 2019

(54) DEVICE AND METHOD FOR OPTICALLY MEASURING A MEASUREMENT OBJECT

(71) Applicant: Precitec Optronik GmbH, Neu-Isenburg (DE)

(72) Inventors: Christoph Dietz, Obertshausen (DE); Martin Schönleber, Aschaffenburg (DE); Jean-Francois Pichot, Trets (FR)

(73) Assignee: PRECITEC OPTRONIK GMBH, Neu-Isenburg (DE)

( * ) Notice: Subject to any disclaimer, the term of this patent is extended or adjusted under 35 U.S.C. 154(b) by 0 days.

(21) Appl. No.: 16/056,928

(22) Filed: Aug. 7, 2018

(30) Foreign Application Priority Data

Jun. 20, 2018 (DE) .................. 10 2018 114 860

(51) Int. Cl.
*G02B 21/00* (2006.01)
*G01B 11/24* (2006.01)
*G01B 11/06* (2006.01)

(52) U.S. Cl.
CPC ...... *G02B 21/0032* (2013.01); *G01B 11/0608* (2013.01); *G01B 11/24* (2013.01); *G02B 21/0064* (2013.01)

(58) Field of Classification Search
CPC .............. G01B 11/0608; G01B 11/24; G02B 21/0064; G02B 21/0032
See application file for complete search history.

(56) References Cited

U.S. PATENT DOCUMENTS

| 8,599,372 B2 * | 12/2013 | Chen ................. G02B 21/0064 |
| | | 356/300 |
| 9,494,529 B1 * | 11/2016 | Fresquet ............ G02B 21/0032 |
| 9,739,600 B1 * | 8/2017 | Fresquet ................ G01B 11/22 |

(Continued)

FOREIGN PATENT DOCUMENTS

EP  3222964 A1  9/2017

*Primary Examiner* — Roy M Punnoose
(74) *Attorney, Agent, or Firm* — Lucas & Mercanti, LLP; Klaus P. Stoffel

(57) ABSTRACT

A chromatic confocal measuring device includes a light source, which emits light of a plurality of wavelengths, and a first beam splitter, via which the light from the light source into an imaging optical unit having chromatic aberration on. Light reflected from the measurement object is imaged by the imaging optical unit and the first beam splitter onto a first confocal detection stop arrangement, such that the first confocal detection stop arrangement functions as a confocal aperture. Light incident through the first detection stop arrangement is detected and evaluated by a first detection device. The measuring device has a first slit stop, which functions as a confocal aperture of the measuring device. The measuring device additionally includes a second detection device and a second beam splitter, wherein the second beam splitter splits the light reflected from the measurement object into a first and a second partial beam, which image the same spatial region of the measurement object. The first detection device detects light of the first partial beam by a linear detector and evaluates total intensities over all wavelengths in order to create a total intensity profile and/or a total intensity image therefrom. The second detection device at the same time spectrally splits light of the second partial beam and evaluates intensities of the light of a plurality of individual wavelengths.

16 Claims, 5 Drawing Sheets

(56) References Cited

U.S. PATENT DOCUMENTS

| | | | | |
|---|---|---|---|---|
| 2004/0051879 A1* | 3/2004 | Schick | ............... | G01B 11/026 356/601 |
| 2004/0109170 A1* | 6/2004 | Schick | ............... | G01B 11/026 356/614 |
| 2009/0021750 A1* | 1/2009 | Korner | ............... | G01B 11/25 356/601 |
| 2011/0013186 A1* | 1/2011 | Miki | ............... | G01B 11/026 356/364 |
| 2015/0055215 A1* | 2/2015 | Chen | ............... | G02B 21/0064 359/386 |
| 2016/0377995 A1* | 12/2016 | Fresquet | ............... | G03F 9/703 355/74 |

* cited by examiner

DEVICE AND METHOD FOR OPTICALLY MEASURING A MEASUREMENT OBJECT

CROSS-REFERENCE TO RELATED APPLICATIONS

The present application claims priority of DE 10 2018 114 860.7, filed Jun. 20, 2018, the priority of this application is hereby claimed and this application is incorporated herein by reference.

BACKGROUND OF THE INVENTION

The invention lies in the field of chromatic confocal measurement technology and image sensors having an extended depth of field range.

A measuring device of the generic type comprises a light source, which emits light of a plurality of wavelengths, wherein a measurement object is illuminated by means of the light source. Moreover, this comprises a first beam splitter, via which the light from the light source is guided into an imaging optical unit, wherein the imaging optical unit has a pronounced chromatic aberration. Light reflected from the measurement object is imaged by the imaging optical unit and the first beam splitter onto a first confocal detection stop arrangement, in such a way that the first confocal detection stop arrangement functions as a confocal aperture. Advantageously, light both reflected directionally from the surface and reflected diffusely from the surface is detected. A first detection device detects light incident through the first confocal detection stop arrangement and evaluates it.

EP 3 222 964 A1 discloses a chromatic confocal device for determining the surface of an object. The device comprises a broadband light source and a lens having chromatic aberration, such that light of different wavelengths is focused at different axial distances. The device comprises a plurality of optical measurement channels that respectively image a point on the object surface, wherein a total intensity over all wavelengths is evaluated, instead of a spectral evaluation, at least for a portion of the measurement channels. In one embodiment of the device, the output channels are formed by optical fibers with fiber couplers, such that the total intensity and the spectrum of a measurement channel can be evaluated simultaneously. On the illumination side, the light from the light source is likewise guided by optical fibers, wherein the fiber ends serve as confocal measurement or illumination apertures and are imaged by the device onto the measurement points on the object.

Said device has the disadvantage, however, that, owing to the individual fibers, continuously uniform illumination and imaging of the object is not possible. Moreover, with the use of fibers, the diameter and spacing of the measurement points are limited by the diameter of the fibers which form the measurement channels. In the case where the desired measurement point spacings and diameters are significantly less than the diameters and spacings of the fibers, an objective lens having a reduction scale beta <<1 is required, which significantly increases the costs and the dimensions for the objective lens. The ratio of fiber core to fiber external diameter additionally imposes a lower limit for the ratio of point diameter to point spacing. If the measurement point spacings and diameters are intended to be variable, then movable parts of the objective lens are required, as a result of which the costs and dimensions increase still further. If the fibers are omitted, then it is no longer possible for the total intensity and the spectrum to be evaluated simultaneously (paragraph 131 of EP 3 222 964 A1). A large number of fibers and fiber couplers that would be required to measure a large spatial region all at once are moreover very expensive and voluminous.

SUMMARY OF THE INVENTION

Therefore, it is an object of the invention to specify a compact, robust and expediently producible device for the confocal chromatic imaging and measurement of a measurement object which simultaneously allows a rapid determination of the total intensity and an evaluation of a reflected spectrum of the same spatial region of the measurement object, extended in at least one direction.

It is furthermore an object of the invention to enable a simultaneous rapid evaluation of the total intensity image and the spectrum, wherein the measurement point spacings are not predefined by the optical components.

The invention is based on the insight that by using a first slit stop as a confocal aperture on the illumination side a uniform illumination of the measurement region arises, as a result of which a uniform imaging of the total intensity reflected from the measurement object onto a fast linear detector in a first detection device becomes possible. A uniform illumination is understood here to mean an illumination of largely continuously constant intensity, in contrast to discreet measurement points which are illuminated through a grid of confocal pinhole stops. Surprisingly, it has been ascertained that despite the use of this spatially extended aperture instead of the known punctiform apertures it is also possible to evaluate the spectral distribution of the light reflected from the measurement object, as a result of which height information, for example, is determinable. In order to enable a simultaneous evaluation both of the total intensity and of the spectral distribution of the same region of the surface of the measurement object, without losing the advantages of the extended confocal aperture (slit stop), the measuring device comprises a second beam splitter, which splits the light reflected from the sample into two partial beams, such that the partial beams can be evaluated differently at the same time. In this case, according to the invention, a detection device over all wavelengths of one partial beam is evaluated by a first detection device and light of the other partial beam is spectrally split and intensities of individual wavelengths or wavelength ranges are determined by a second detection device.

According to the invention, the imaging optical unit has a pronounced chromatic aberration. In this case, the chromatic aberration is advantageously so pronounced that the focal plane of the shortest wavelength used and the longest wavelength used are at a distance from one another which correspond to a predefined height measurement range of the measuring device. Advantageously, the imaging optical unit comprises for this purpose at least one lens having an Abbe number of less than 50, preferably less than 40, particularly preferably less than 30.

According to one preferred embodiment of the invention, the first confocal detection stop arrangement is likewise a (second) slit stop. Particularly preferably, the dimensions of the second slit stop, which forms the first confocal detection stop arrangement, correspond to the dimensions of the first slit stop. In this case, the first and second slit stops and the imaging optical unit are arranged such that the focused imaging of the first slit stop on the measurement object is in turn imaged congruently onto the second slit stop. This enables an optimum utilization of the information content of the light beam.

In the context of this invention, a slit stop should be understood to mean a stop whose extent in one direction is significantly longer (in particular at least double the length) compared with the extent in a direction perpendicular thereto. Preferably, slit stops are at least approximately rectangular, wherein an alternative shaping, e.g. rounding, of the narrow edges also comes under the term slit stop.

In the context of this invention, a total intensity is understood to mean a measured intensity summed by a detector at a specific point or over a small, spatially delimited area (pixel) over the entire wavelength range used. In this case, different total intensities are determined at different locations and/or at different points in time.

Advantageously, the first and second detection devices contain detectors configured to spatially resolve the location of the incident light. In this case, intensities of incident light are determined at a plurality of locations, for example by a plurality of individual detector pixels. In this way a spatial resolution of light incident in the first and second detection devices is possible along at least one dimension, wherein preferably the dimension which corresponds to the longer edge of the second slit stop is spatially resolved.

Preferably, matrix detectors, that is to say detectors which allow a resolution of the incident light intensity in two dimensions, are used in the second detection device. In one preferred embodiment of the invention, the detector in the second detection device is arranged such that the longer side of the slit stop is imaged along one dimension of the detector, while light of different wavelengths is split by a dispersive element along the second dimension of the detector.

It is known that the read-out of a linear detector can generally be carried out more rapidly than the read-out of all information of a matrix detector. In other words, a matrix detector has a lower so-called "frame rate" than a linear detector. Therefore, an evaluate rate of such a linear detector can be selected to be higher (faster). One preferred embodiment of the invention makes use of this fact by virtue of an evaluation rate of the linear detector of the first detection device being selected to be higher than an evaluation rate of the second detection device. This has the advantage that an intensity image can be created more rapidly, as a result of which a higher resolution in the intensity image (in the scan direction) is possible for example during a scan of the measurement object.

Advantageously, the second detection device comprises a shutter, which can interrupt the illumination of the matrix detector at least at times. This ensures that during a scan of the measurement object, that is to say a movement relative to the measurement object, for an evaluation rate only light of a small spatial region is incident on the matrix detector, in order to prevent blurring of the measurement values. Preferably, the shutter is opened only for the time period of an evaluation of the linear detector.

Advantageously, the light source emits light over a continuous spectrum. This is usually also referred to as a "broadband light source".

Preferably, height information is obtained from the spectral distribution of the detected light in the second detection device according to the known chromatic confocal measurement principle. Preferably, one or more items of height information of the surface of the measurement object is/are deduced from the intensity distributions over a plurality of individual wavelengths or plurality of wavelength ranges, said intensity distributions being detected by the second detection device. In this case, the items of height information are determined directly in the detection device and/or in an assigned evaluation device. Height information is understood here to mean for example a distance between the surface of the measurement object and the measuring device or a predefined reference plane or the relative height of points on the surface with respect to one another. In the case of measurement objects which are at least partly transparent to the light used, items of height information can also comprise thicknesses of the measurement object or thicknesses of individual layers of the measurement object.

An evaluation of the total intensity yields an imaging which contains no height information, but can image structures transversely with respect to the height, specifically owing to the fact that different wavelengths are focalized at different heights in the region of the measurement object, with a greater depth of field than would be the case without the chromatic aberration of the imaging optical unit.

According to one preferred embodiment of the invention, the total intensity image obtained by the first detection device and the items of height information obtained by the second detection arrangement simultaneously for the same measurement region can be combined, for example be represented in a superimposed manner by a display device. Particularly preferably, it is possible to evaluate and output both height information and a total intensity imaging resolved more accurately in the plane transverse with respect to the height.

In order to utilize the advantages of the slit stop over a grid of pinhole stops, the light reflected from the measurement object is preferably propagated through a free-space optical unit between the measurement object and the first and also second detection device. It is further preferred for the light from the light source to propagate as far as the measurement object through a free-space optical unit. This additionally has the advantages that the measuring device can be fashioned more robustly and is less expensive to construct, and is largely independent of temperature.

According to one preferred embodiment of the invention, the second beam splitter is a beam splitter cube particularly preferably comprising two prisms connected to one another, a beam splitter surface extending between said prisms. Particularly preferably, the first beam splitter is also such a beam splitter cube.

According to one particularly preferred embodiment of the invention, the illumination-side first slit stop is applied directly on a surface of the first beam splitter. Additionally or alternatively, the first confocal detection stop arrangement is also applied directly on a surface of the first or second beam splitter. This implementation makes the device more robust since displacement of the optical components with respect to one another becomes less likely. A configuration of the invention in which the relevant surfaces of the beam splitter cubes are covered by a nontransparent coating and the stops are formed by coating-free locations is particularly compact and simple.

The splitting ratio of the beam splitter is preferably selected such that the distribution of the intensity of the measurement light among the partial beams is optimized. The second detection device spectrally splits the light and directs it onto a matrix detector. As a result, the measurement light is distributed along more pixels than in the case of the linear detector of the first detection device. This effect is preferably compensated for by the splitting ratio of the beam splitter.

According to one preferred embodiment of the invention, the first confocal detection stop arrangement is arranged in the beam path of the first partial beam and a second confocal detection stop arrangement is arranged in the beam path of the second partial beam. Particularly preferably, the first detection stop arrangement is a (second) slit stop and the second detection stop arrangement is either a slit stop a (third) slit stop or at least one series of pinhole stops.

According to an alternative embodiment of the invention, the first confocal detection stop arrangement is arranged in the beam path between the first beam splitter and the second beam splitter. This embodiment has the advantage that the measuring device is particularly robust since only one detection stop arrangement is necessary and the latter, as mentioned above, just like the illumination-side first slit stop, can be applied on the first beam splitter cube, as a result of which a displacement with respect to one another becomes particularly unlikely.

According to a further alternative embodiment of the invention, the second beam splitter is embodied as a diffraction grating, wherein the zeroth order of diffraction forms the first partial beam and the first order of diffraction forms the second partial beam. This enables a particularly compact design.

Advantageously, at least parts of the measuring device are integrated into a measuring head, preferably at least the imaging optical unit and the first and second beam splitters. Particularly preferably, the measuring head has a smaller extent in one direction perpendicular to the optical axis than in the other direction perpendicular to the optical axis. Particularly preferably, the direction with a smaller extent is the direction of the narrower edge of the first silt stop. A more compact design becomes possible as a result.

More specific details concerning the embodiments can be gathered from the description of the figures.

The invention additionally relates to a method for the chromatic confocal measurement of a measurement object, wherein the measurement object is illuminated in a spatial region extended in one dimension by means of a light source, which emits light of a plurality of wavelengths, wherein light of different wavelengths is focused at different heights in the region of the measurement object. Light reflected from the measurement object is imaged onto a first confocal detection stop arrangement, in particular a second slit stop, in such a way that the first detection stop arrangement functions as a confocal aperture. The light is detected and evaluated by a first detection device. The light reflected from the measurement object is split into two partial beams by a second beam splitter, said partial beams imaging the same spatial region of the measurement object. A total intensity over all wavelengths of the first partial beam is detected and evaluated and the light of the second partial beam is spectrally split and intensities of individual wavelengths or wavelength ranges are detected and evaluated.

Preferably, items of height information are obtained from the distribution of the intensity over the wavelengths or wavelength ranges. Wavelengths having a (local or global) maximum of the intensity typically correspond to an item of height information.

Particularly preferably, the obtained items of height information are assigned to locations within the measurement region. With further preference, the items of height information are assigned to sections of a total intensity image or total intensity profile. Advantageously, the measuring device comprises means for displaying the total intensity image or total intensity profile and the assigned items of height information, for example in a manner superimposed or otherwise visually assigned.

The uniform illumination of the measurement region and the uniform imaging onto the detection devices make it possible to represent in the evaluation the effect of different apertures that can be regarded as virtual apertures.

In the simplest case here individual pixels of the detectors used together with the width of the second slit stop used, in the intermediate image, form effective apertures. To that end, only the intensity of said individual pixels is taken into account in the evaluation; said individual pixels form the transmissive regions of the confocal apertures. The intensity of the rest of the pixels is not take into account in the evaluation and thus forms the non-transmissive regions of the confocal apertures.

By means of suitable evaluation of the data, it is also possible to represent other visual apertures, for example by different adjacent pixels being combined to form an aperture and the corresponding intensity values being summed in the evaluation.

Virtual apertures can differ in a plurality of parameters: arrangement of the midpoints and size of the apertures. Preferably, the midpoints are arranged at uniform distances, such that the locations of the midpoints are characterized by the location of a first aperture and by the distance between the midpoints of the apertures.

Advantageously, the sizes and spacings of the apertures are selected appropriately with respect to the structures of the surface.

Preferably, a plurality of evaluations with different confocal apertures are carried out for a spatial region of the object, without movement of the measuring device or of the measurement object relative to one another. According to conventional confocal measurement methods, the midpoints of the apertures are fixed and, therefore, without moving the measuring head or the measurement object, only the heights of individual points on the surface can be determined with a certain distance between the points. By using virtual apertures, it is possible to carry out in particular a plurality of evaluations with mutually displaced midpoints of the virtual apertures, as a result of which the distance between the individual height information points can be reduced. This constitutes a type of virtual scan along the longer edge of the second slit stop.

Advantageously, the measuring device and the measurement object can be moved relative to one another, wherein preferably in the direction of the narrow edge of the slit stops there is carried out a scan, i.e. a plurality of measurements at a plurality of positions and a joint evaluation of the measurement data. In this way, a total intensity image can advantageously be created by the imagings of a plurality of adjacent measurement regions being represented jointly.

Advantageously, during a scan, the measuring device, or a part of the measuring device (measuring head), is moved relative to the measurement object, preferably in the direction of the narrow edge of the first slit stop. Particularly preferably, the speed of the movement here is selected in such a way that within an evaluation cycle (i.e. a time period over which evaluation is effected) of the first detection device the measuring device moves by less than the width of the first slit stop. In each evaluation cycle, a profile of the total intensity is measured, and the various profiles are subsequently combined to form a total image.

Preferably, a profile of height information (height profile) along the long edge of the slit stop is created from the data of the second detection device for each evaluation cycle.

According to one preferred embodiment of the invention, the light incidence on the second detection device is blocked by a shutter at times, preferably in such a way that the matrix detector at the second detection device receives light only for the length of an evaluation cycle of the first detection device. What is achieved as a result is that the items of height information obtained correspond to a spatially delimited location of the surface of the measurement object and are not blurred or are only slightly blurred. Advantageously, this process is synchronized with the evaluation of the first detection device, with the result that the intensity profile to which a given height profile corresponds is known. Advantageously, the items of information are represented on an output device in a manner superimposed or otherwise visually assigned.

A further preferred embodiment of the invention involves carrying out a first scan for creating an intensity image, and then a second scan for detecting items of height information. Particularly preferably, items of height information are implemented at locations of particular interest, which are identified from the intensity image.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

BRIEF DESCRIPTION OF THE DRAWING

In the drawing.

Identical reference signs are used for identical parts in all of the figures.

DETAILED DESCRIPTION OF THE INVENTION

Figure 1:
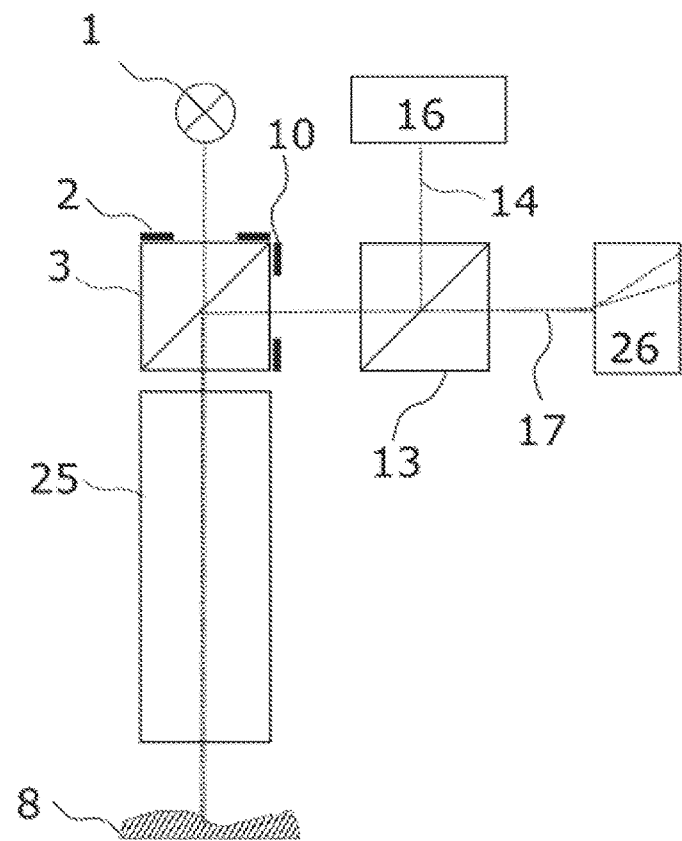
FIG. 1: shows a schematic illustration of a chromatic confocal measuring device.

FIG. 1 schematically shows one exemplary chromatic confocal measuring device.

A light source 1, which is part of an illumination device, emits light of a plurality of wavelengths, wherein the illumination device is configured to illuminate a measurement object 8 by means of the light source 1 through an imaging optical unit 25. The illumination device comprises a first slit stop 2, which functions as a confocal aperture of the measuring device.

A first beam splitter 3 guides the light from the illumination device into an imaging optical unit 25, wherein the imaging optical unit 25 has a pronounced chromatic aberration.

Light reflected from the measurement object is imaged by the imaging optical unit 25 and the first beam splitter 3 onto a first confocal detection stop arrangement 10, in such a way that the first detection stop arrangement 10 functions as a confocal aperture.

The measuring device comprises a second beam splitter 13, which splits the light reflected from the measurement object 8 into a first and a second partial beam 14, 17 which image the same spatial region of the measurement object 8.

The measuring device additionally comprises a first detection device 16, which detects and evaluates light incident through the first confocal detection stop arrangement 10, and a second detection device 26. The first detection device 16 is configured to detect light of the first partial beam 14 by means of a linear detector and to evaluate total intensities over all wavelengths. The second detection device 26 is configured at the same time to spectrally split light of the second partial beam 17 and to detect and evaluate intensities of the light of a plurality of individual wavelengths or a plurality of wavelength ranges.

Figure 2:
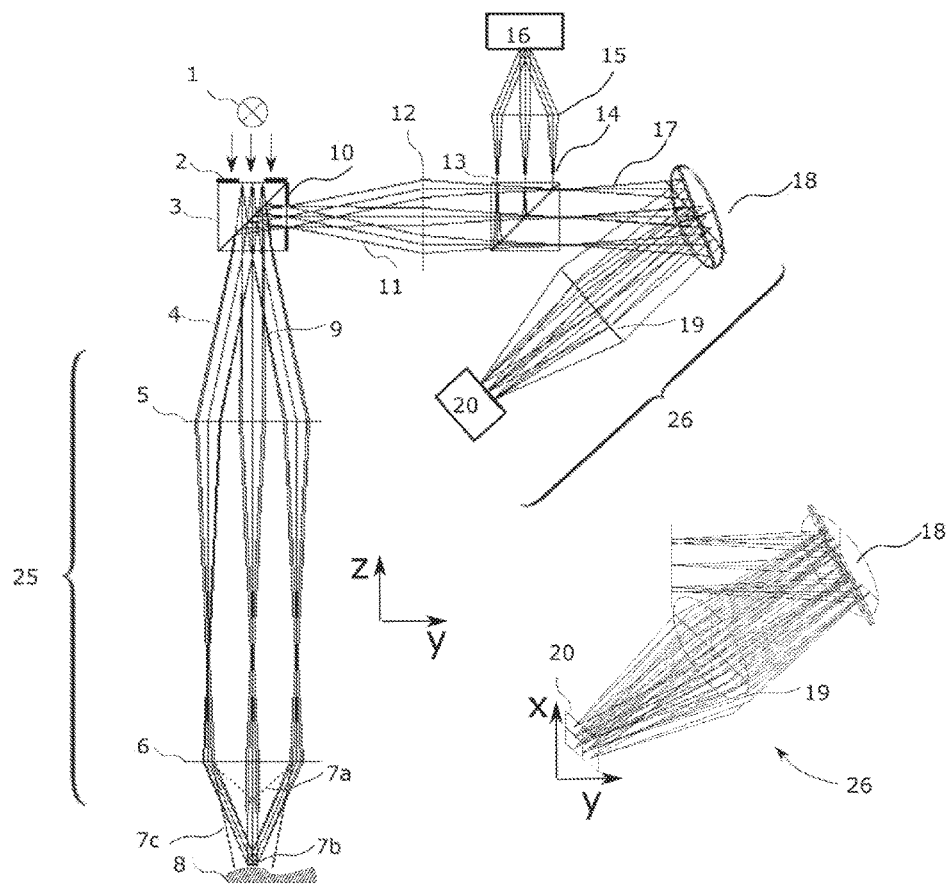
FIG. 2: shows one preferred embodiment of a chromatic confocal measuring device.

FIG. 2 shows an exemplary chromatic confocal measuring device according to one preferred embodiment of the invention.

A light source 1 emits light of a plurality of wavelengths. The light is incident through a first slit stop 2 applied on a side of a first beam splitter cube 3. The light source 1 and the first slit stop 2 together form an illumination device.

The light is subsequently imaged onto a measurement object 8 by an imaging optical unit 25, which is formed by way of example from a first lens 5 and a second lens 6. The beam path is illustrated schematically by the lines 4. As a result of the chromatic aberration of the imaging optical unit 25, light of different wavelengths is focused at different points or heights 7a, 7b, 7c relative to the measurement object 8.

Light reflected by the measurement object 8 returns through the imaging optical unit (i.e. lenses 6 and 5) and the first beam splitter cube 3. The beam path is illustrated schematically by the line 9.

In the beam splitter cube 3, one part of the light is transmitted back in the direction of the light source 1, while another part of the light is reflected in the direction of a second beam splitter cube 13. A confocal detection stop arrangement 10 is fitted on that surface of the first beam splitter cube 3 which is arranged in the direction of the second beam splitter cube 13, said confocal detection stop arrangement consisting for example of a second slit stop. The second slit stop is oriented such that the imaging—reflected from the measurement object 8—of the first slit stop 2 is in turn imaged approximately congruently thereon.

The first beam splitter cube 3 and the illumination device can alternatively be arranged such that light transmitted by the beam splitter is guided in the direction of the second beam splitter cube 13, while the light source 1 is arranged on the reflected path.

The second beam splitter cube 13 splits the beam into two partial beams (14, 17). A first partial beam 14 is directed in the direction of a first detection device 16. The detection device 16 comprises a linear detector consisting of a plurality of pixels. The pixels are arranged along a row, in such a way that light which is distributed in the direction of the long edge of the second slit stop (confocal detection stop arrangement 10) is imaged along the row of pixels.

The linear detector of the detection device 16 measures total intensities over all used wavelengths in each pixel of the linear detector. This allows the creation of an intensity profile along the direction of the long edge of the slit stops.

The second partial beam 17 is split into its spectral components by a dispersive element 18 (e.g. a diffraction grating). This forms a two-dimensional light field that is imaged onto a matrix detector 20. The matrix detector is thus able to measure an intensity for each location along the long edge of the slit stops and for each wavelength. The second detection device 26 is configured to determine items of height information of the measurement object from these measured intensities.

The second detection device 26 is once again illustrated in perspective view at the bottom right in FIG. 2.

By way of example, lenses 12, 15 and 19 are arranged such that the confocal detection stop arrangement 10 is imaged onto the detectors. By way of example, a third lens 12 is arranged between the first beam splitter 3 and the second beam splitter 13. Advantageously, the third lens 12 is selected and arranged such that the light is collimated in the beam splitter 13.

By way of example, a fourth lens 15 is arranged between the second beam splitter 13 and the first detection device 16, and a fifth lens 19 is arranged between the dispersive element 18 and the matrix detector 20.

Figures 3, 4:
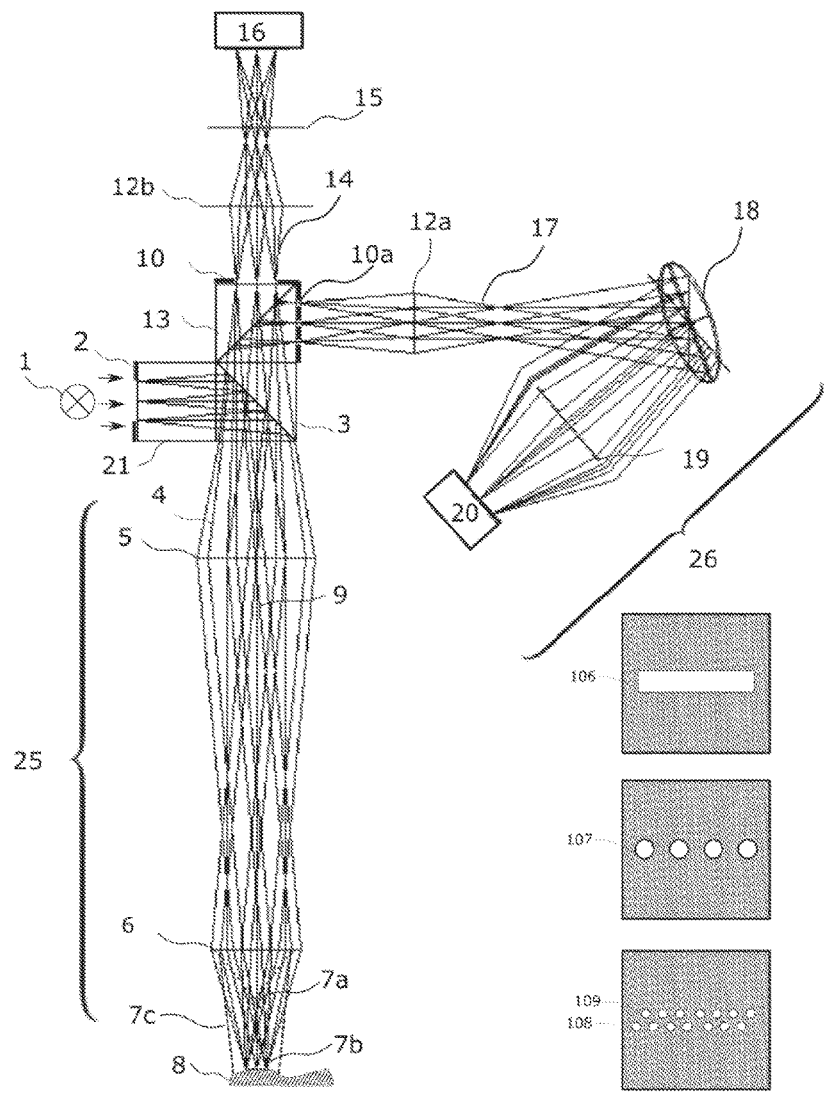
FIG. 3: shows a further preferred embodiment of a chromatic confocal measuring device.
FIG. 4: shows exemplary stop arrangements.

FIG. 3 shows an alternative embodiment of the invention.

A light source 1 emits light of a plurality of wavelengths. The light is incident through a first slit stop 2. The first slit stop 2 is preferably applied on a glass block 21, by way of example a glass cube. The use of a glass block 21 is advantageous in the construction of the measuring device and prevents the components from being displaced relative to one another. However, the device can also alternatively be embodied without the glass block 21, in which case the change in the optical path length that is caused as a result has to be taken into account.

A first beam splitter 3 is preferably situated in a manner directly adjoining the glass block 21. Said first beam splitter reflects part of the light of the light source 1 in the direction of an imaging optical unit 25 and a measurement object 8, as described above in association with FIG. 2.

Light reflected from the measurement object 8 returns to the first beam splitter 3 again along the beam path 9. In this case, part of the light is transmitted in the direction of the second beam splitter 13. The latter advantageously directly adjoins the first beam splitter 3.

The second beam splitter 13 splits the light into a first partial beam 14 and a second partial beam 17. In this case a respective confocal detection stop arrangement is arranged in each of the partial beams: a first confocal detection stop arrangement 10 in the first partial beam 14 and a second confocal detection stop arrangement 10a in the second partial beam 17. By way of example, the first and second confocal detection stop arrangements 10, 10a are applied in each case on surfaces of the second beam splitter 13.

Light which is focused on the surface of the measurement object 8 is imaged in this case by the imaging optical unit 25 onto the first and second confocal detection stop arrangements 10, 10a.

The first partial beam 14 is imaged by lenses 12b and 15 onto a linear detector of a first detection device 16, which measures a total intensity of the light incident thereon over all wavelengths.

The second partial beam 17 is collimated by a lens 12a and spectrally split by a dispersive element 18, for example a diffraction grating. The light field that arises as a result is focused onto a matrix detector 20 by a lens 19.

FIG. 4 shows various confocal detection stop arrangements. Preferably, a slit stop 106 is used for the confocal detection stop arrangements 10 and 10a of the embodiments shown in FIGS. 1 to 3.

Alternatively, a row of pinhole stops 107 is used. By way of example, the diameter of the pinhole stops 107 in this case corresponds to the dimeter of the first slit stop 2. The row of pinhole stops is advantageously used only for the second detection stop arrangement 10a.

A further possibility is the use of at least two offset rows of pinhole stops 108 and 109. This arrangement makes it possible to have a high point density of pinhole stops, and in this case to reduce so-called "crosstalk", that is to say an interfering signal from adjacent points of the surface of the measurement object.

Figure 5:
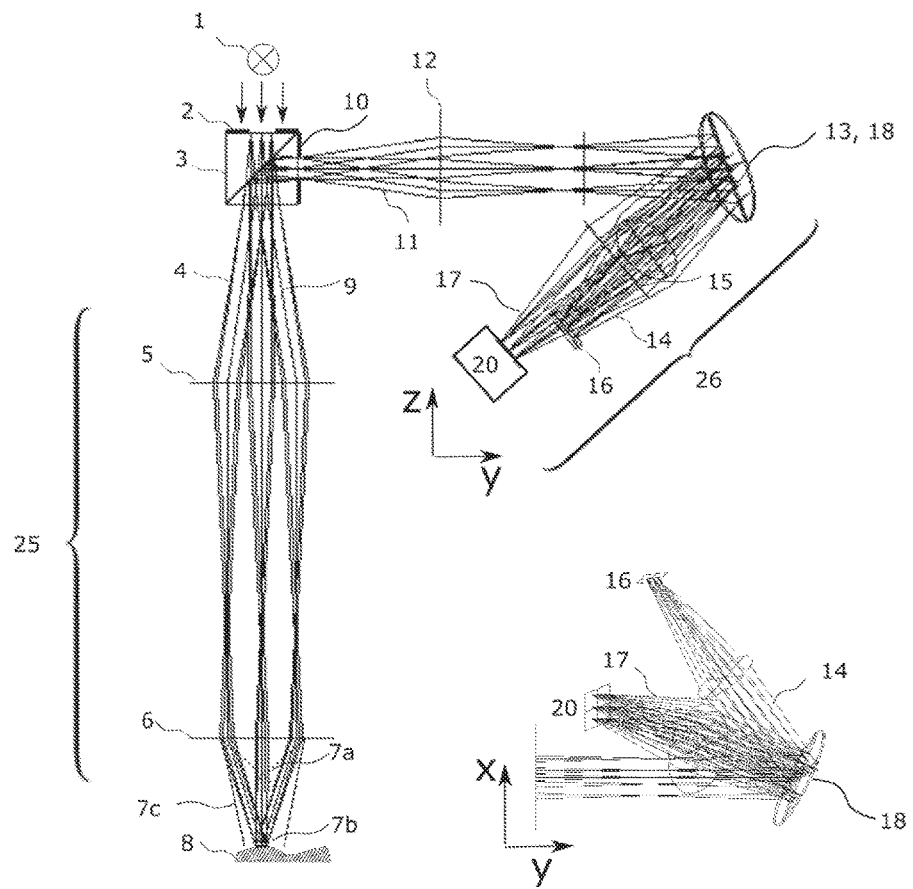
FIG. 5: shows a further preferred embodiment of a chromatic confocal measuring device.

FIG. 5 shows a further alternative embodiment of the invention. Instead of a beam splitter cube, a diffraction grating 18 is used simultaneously for splitting into two partial beams and for spectral splitting.

The parts of the measuring device which concern the illumination device, the imaging optical unit and the first beam splitter 3 function as described above concerning FIG. 2.

Downstream of the first beam splitter 3, the light is guided onto the diffraction grating 18, which simultaneously functions as a beam splitter 13. By way of example, at least one lens 12 is arranged between the first beam splitter 3 and the diffraction grating 13, 18 in order to collimate the light.

The zeroth order of diffraction of the diffraction grating 18 forms the first partial beam 14, for example, while the spectrally split first order of diffraction forms the second partial beam 17. The first partial beam 14 is incident on a linear detector of a detection device 16, which measures total intensities at the location of individual pixels of the linear detector.

The spectrally split second partial beam 17 is incident on a matrix detector 20, which measures intensities depending on a location x and a wavelength $\lambda$. The matrix detector 20 is part of a second detection device 26, which is configured to obtain height information of the measurement object 8 from the spectral distribution of the intensities.

Figure 6:
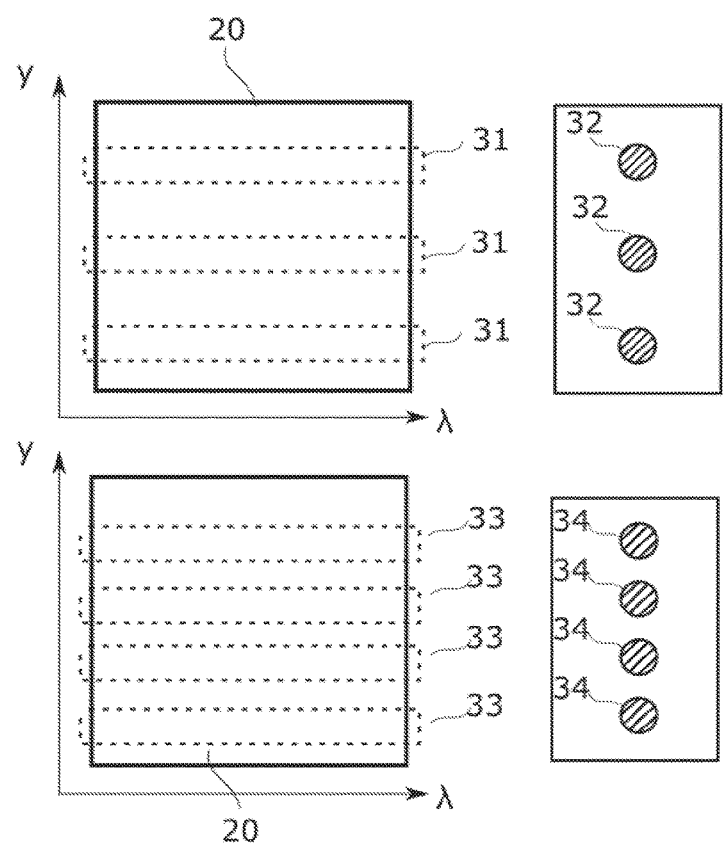
FIG. 6: shows a schematic basic drawing of virtual apertures.

FIG. 6 schematically shows the principle of virtual confocal apertures. As explained above, one dimension of a matrix detector 20 of the second detection device corresponds to a spatial position along the slit stop imaged on the measurement object 8 (y-axis), while the other dimension corresponds to a wavelength $\lambda$. The light incident in the second detection device is spectrally split along the $\lambda$-axis in this case.

Height information can only ever be obtained for a spatially delimited, finite region on the measurement object 8. This spatial region corresponds to a virtual aperture in the chromatic confocal measurement principle. In this case, a spectrum is considered over the pixels that lie in a region 31, 33 on the matrix detector 20, and one or more items of height information are obtained from the spectrum according to methods known per se. This corresponds to a consideration of a confocal aperture 32, 34 in a virtual stop.

One of the advantages of the method according to the invention is that the regions 31, 33 can be selected freely. By way of example, if the distances between the regions 31 are selected to be large, this corresponds to spaced-apart virtual apertures 32. If the distances are selected to be smaller (regions 33), then this corresponds to more closely placed virtual apertures 34. It is likewise possible to vary the diameters of the virtual apertures by varying the widths in the y-direction of the regions 31, 33.

Figure 7:
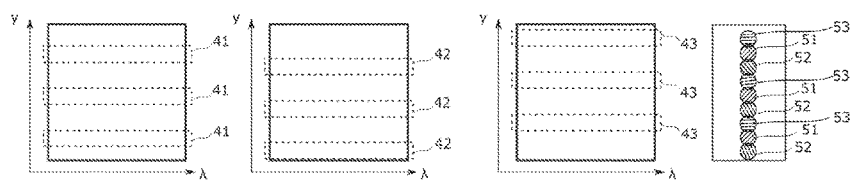
FIG. 7: shows a schematic basic drawing of a virtual scan.

FIG. 7 schematically shows the principle of a virtual scan of the second detector along the x-axis. In this case, while the measuring device and the measurement object remain in the same relative position, the pixel regions are displaced. By way of example, the three selected groups of pixel regions 41, 42, 43 lead to almost overlapping virtual apertures 51, 52, 53.

By virtue of such overlapping virtual apertures 51, 52, 53, it is possible to create a height profile with higher resolution than would be possible with real apertures.

While specific embodiments of the invention have been shown and described in detail to illustrate the inventive principles, it will be understood that the invention may be embodied otherwise without departing from such principles.

We claim:

1. A chromatic confocal measuring device, comprising a light source, which emits light of a plurality of wavelengths, a first beam splitter, via which the light from the light source is guided into an imaging optical unit, wherein the imaging optical unit has a chromatic aberration, wherein light reflected from the measurement object is imaged by the imaging optical unit and the first beam splitter onto a first confocal detection stop arrangement, in such a way that the first confocal detection stop arrangement functions as a confocal aperture, a first detection device, which detects and evaluates light incident through the first detection stop arrangement, wherein the measuring device comprises a first slit stop, which functions as a confocal aperture of the measuring device, the measuring device comprises a second detection device and a second beam splitter, wherein the second beam splitter splits the light reflected from the measurement object into a first and a second partial beam, which image the same spatial region of the measurement object, wherein the first detection device is configured to detect light of the first partial beam by means of a linear detector and to evaluate total intensities over all wavelengths and to create a total intensity profile and/or a total intensity image, and the second detection device is configured at the same time to spectrally split light of the second partial beam and to detect and evaluate intensities of the light of a plurality of individual wavelengths or of a plurality of wavelength ranges.

2. The measuring device according to claim 1, wherein an evaluation rate of the first detection device, is higher than an evaluation rate of the second detection device.

3. The measuring device according to claim 1, wherein the second detection device and/or an assigned evaluation device are/is configured to deduce one or more items of height information of the surface of the measurement object from the intensity distributions over the plurality of individual wavelengths or plurality of wavelength ranges, said intensity distributions being detected by the second detection device.

4. The measuring device according to claim 1, wherein the light reflected from the measurement object propagates through a free-space optical unit between the measurement object and the first and also second detection device.

5. The measuring device according to claim 1, wherein the light from the light source propagates as far as the measurement object through a free-space optical unit.

6. The measuring device according to claim 1, wherein the first confocal detection stop arrangement is a second slit stop.

7. The measuring device according to claim 1, wherein the second beam splitter is a beam splitter cube comprising, two prisms connected to one another, a beam splitter surface extending between said prisms.

8. The measuring device according to claim 1, wherein the first slit stop is applied directly on a surface of the first beam splitter and/or the first confocal detection stop arrangement is applied directly on a surface of the first or second beam splitter.

9. The measuring device according to claim 1, wherein the second beam splitter causes a predefined splitting ratio between the partial beams, wherein the splitting ratio is chosen such that the intensities of the two partial beams are not identical.

10. The measuring device according to claim 1, wherein the first confocal detection stop arrangement is arranged in the beam path of the first partial beam and a second confocal detection stop arrangement is arranged in the beam path of the second partial beam.

11. The measuring device according to claim 1, wherein the first confocal detection stop arrangement is arranged in the beam path between the first beam splitter and the second beam splitter.

12. The measuring device according to claim 11, wherein at least one lens is arranged in the beam path between the first confocal detection stop arrangement and the second beam splitter.

13. The measuring device according to claim 1, wherein the second beam splitter is embodied as a diffraction grating, wherein the zeroth order of diffraction forms the first partial beam and the first order of diffraction forms the second partial beam.

14. A method for the chromatic confocal measurement of a measurement object, wherein the measurement object is illuminated in a slit-shaped spatial region by means of a light source, which emits light of a plurality of wavelengths, wherein light of different wavelengths is focused at different heights in the region of the measurement object and light reflected from the measurement object is imaged onto a first confocal detection stop arrangement, in such a way that the first confocal detection stop arrangement functions as a confocal aperture, wherein the light is detected and evaluated by a first detection device, wherein the light reflected from the measurement object is split into two partial beams which image the same spatial region of the measurement object, wherein a total intensity over all wavelengths of the first partial beam is detected and evaluated, and the light of the second partial beam is spectrally split and spectral intensities of individual wavelengths or wavelength ranges are detected and evaluated.

15. The method according to claim 14, wherein detected spectral intensities are evaluated according to selectable virtual confocal apertures.

16. The method according to claim 15, wherein a plurality of evaluations with different virtual confocal apertures are carried out for a spatial region of the measurement object, wherein the locations of the virtual confocal apertures are selected to be different.

* * * * *